United States Patent [19]

Iizuka et al.

[11] Patent Number: 5,021,523

[45] Date of Patent: *Jun. 4, 1991

[54] POLYMER ALLOY OF POLYARYLENE THIOETHER AND A PROCESS FOR PRODUCING THE SAME

[75] Inventors: Yo Iizuka; Ken Kashiwadate; Shunzo Endo; Toshio Hosokawa; Takayuki Katto, all of Iwaki; Toshiya Mizuno, Tsuchiura; Kenichi Katase, Ushiku, all of Japan

[73] Assignee: Kureha Kagaku Kogyo Kabushiki Kaisha, Tokyo, Japan

[*] Notice: The portion of the term of this patent subsequent to Jan. 15, 2008 has been disclaimed.

[21] Appl. No.: 267,371

[22] Filed: Nov. 4, 1988

[30] Foreign Application Priority Data

Nov. 5, 1987 [JP] Japan .............................. 62-279900

[51] Int. Cl.$^5$ ............................................ C08L 81/02
[52] U.S. Cl. .................................... 525/537; 525/189
[58] Field of Search ............................. 525/189, 537

[56] References Cited

U.S. PATENT DOCUMENTS 3,929,930 12/1975 Izawa et al. ..................... 525/391
4,794,164 12/1988 Iwasaki et al. .................... 525/537
5,849,469 7/1989 Crosby et al. ..................... 525/539

OTHER PUBLICATIONS

Hallensleben, European Polymer Journal, vol. 13, pp. 437–440.

*Primary Examiner*—John C. Bleutge
*Assistant Examiner*—David W. Woodward
*Attorney, Agent, or Firm*—Oblon, Spivak, McClelland, Maier & Neustadt

[57] ABSTRACT

Disclosed herein are a polymer alloy prepared by polymerizing 0.1 to 100 parts by weight of at least one radically polymerizable monomer to 100 parts by weight of polyarylene thioether having a repeating unit of

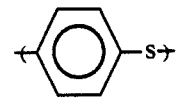

as a main constituent and at least a part of said radically polymerizable monomers is polymerized within inner pores of the polyarylene thioether particles and a process for producing the polymer alloy.

The polymer alloy of polyarylene thioether according to the present invention has the fine particles of the radically polymerized monomer uniformly dispersed in the said polymer alloy, and accordingly, the polymer alloy of polyarylene thioether according to the present invention is excellent in various physical properties, such as, good impact strength and improved anti-flash property.

8 Claims, No Drawings

POLYMER ALLOY OF POLYARYLENE THIOETHER AND A PROCESS FOR PRODUCING THE SAME

BACKGROUND OF THE INVENTION

The present invention relates to a polymer alloy of polyarylene thioether (hereinafter referred to as "PATE"), which is excellent in various properties, for instance, impact strength and is uniformly blended, a process for producing the polymer alloy and a composition containing the same.

Recently, PATE has been used in various fields as a crystalline, thermoplastic resin which is excellent in heat-resistance, moldability, chemical-resistance, oil-resistance, hot water-resistance, flame-resistance, mechanical properties, such as, rigidity. However, since PATE is insufficient in toughness, impact strength and film properties such as sliding property, plating property, adhesiveness and further is apt to cause flash at the time of injection molding, improvement of these properties have been strongly requested.

Hitherto, as a method to improve an impact strength, a method of melt-blending an impact modifier with PATE has been proposed.

For instance, Japanese Patent Application Laid-Open (KOKAI) No. 56-118,456 (1981) discloses an impact-resistant resin composition comprising:

(i) 100 parts by weight of poly(arylene sulfide) or a modified polymer thereof, and (ii) not less than 1 part by weight and less than 100 parts by weight of a block copolymer which contains not less than one polymer block mainly consisting of a vinyl aromatic compound and not less than one polymer block mainly consisting of a conjugated diene compound, and the vinyl aromatic compound in said copolymer contains more than 75 wt % of block homopolymer segment and/or the diene compound in said copolymer contains more than 15 wt % of 1,2-vinyl bonding.

U.S. Pat. No. 4,395,512 discloses a poly(phenylene sulfide) resin composition comprising (a) 100 parts by weight of a poly(phenylene sulfide) resin, (b) 10 to 300 parts by weight of an inorganic filler and (c) 1 to 100 parts by weight of a fluorocarbon rubber which shows the Moony viscosity (ASTM D1646) of 5ML1+10(100° C.) to 300ML1+10(120° C.). Further, U.S. Pat. No. 4,581,411 discloses a composition for molding, which contains poly(arylene sulfide) and a polymeric rubber selected from the group consisting of silicone rubber, ethylene-acryl rubber, ethylene propylene rubber, ethylene propylene-diene rubber and poly(butyl acrylate) rubber in an amount that the polymeric rubber can improve an impact strength and/or a crack-resistance of the product.

However, since the melt-processing temperature of PATE is very high, the conventional impact modifier such as natural rubber, SBR, NBR, isoprene rubber of the modified products thereof, is easy to decompose thermally during melt-processing, and accordingly such a modifier is not suitable as a material to improve impact strength.

Further, the modifier of olefin rubbers such as ethylene-propylene rubber (EPR), is small in thermal decomposition and its cost is relatively low. However, since the compatibility of the modifier of olefin rubbers with PATE is extremely poor, its effect of improving the impact-strength is low. Moreover, there is a problem that the appearance of a molded product obtained from the composition is prone to be very poor.

Still further, although the conventional modifier of polyacrylic ester rubbers does not necessarily thermally decompose easily during melt-blending, the material is still insufficient as an impact modifier for PATE.

Further, Japanese Patent Publication No. 53-13,469 (1978) discloses a method for improving the moldability of PATE by blending polystyrene, a thermoplastic resin, with PATE. However, a compatibility of polystylene with PATE is poor and even when they are blended in an usual manner, it is difficult to obtain a desirable fine dispersion of polystylene in PATE. Namely, such method is not necessarily sufficient.

Generally in polymer blending, it is a well known fact that good dispersibility of added polymer and strong interfacial adhesion between dispersed polymer and matrix polymer are important factors manifesting the physical characteristics of blended products. However, among conventional blending methods so far proposed, there is not known any method with sufficient dispersibility and interfacial adhesion.

As a method to improve various features, such as impact strength, of PATE effectively and economically, the present inventors have extensively studied to mix radically polymerizable monomers with PATE in a different manner and method from those of mixing conventional modifier and to polymerize the monomer, objecting good dispersibility and excellent interfacial adhesion of thus polymerized monomer with PATE.

As a result of such extensive study, they have found that a polymer alloy of PATE prepared by polymerizing at least a part of radically polymerizable monomer, for instance, an acrylic ester monomer, within internal pores of PATE particles, can have an excellent impact strength by manifesting good dispersibility and interfacial adhesion of the radically polymerized monomer with PATE. In addition to the finding, they have also found that by adding fibrous fillers, such as glass fibers in particular, impact strength of the polymer alloy can be improved remarkably because the radically polymerized monomers present in the interface of the fillers and PATE. Based on these findings, the present inventors have attained the present invention.

SUMMARY OF THE INVENTION

The object of the present invention is to provide a polymer alloy of PATE obtained, in the presence of 100 parts by weight of PATE particles having the repeating unit of

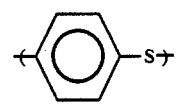

as the main constituent, by polymerizing at least a part of 0.1 to 100 parts by weight of at least one kind of radically polymerizable monomers within the internal pores of the PATE particles.

Further, the object of the present invention is to provide a composition comprising the polymer alloy of PATE and a fibrous filler and/or an inorganic filler in an amount melt-processable with the said polymer alloy.

Moreover, the object of the present invention is to provide a polymer alloy of PATE which has excellent specific properties such as impact-strength, etc. and which has between uniformly mixed.

Further, the object of the present invention is to provide a polymer alloy composition of PATE, which has a radically polymerized monomer present at an interface between fibrous fillers and PATE particles, is excellent in the interfacial adhesion and is excellent in its impact strength.

Moreover, the object of the present invention is to provide a novel process for producing said polymer alloy of PATE.

DETAILED DESCRIPTION OF THE INVENTION

The present invention relates to (1) a polymer alloy of PATE, favorably blended, obtained by polymerizing 0.1 to 100 parts by weight of at least one kind of radically polymerizable monomers in the presence of 100 parts by weight of PATE having a repeating unit of

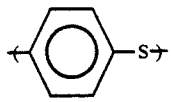

as a main constituent, (2) a process for producing polymer alloy of PATE, favorably blended, comprising the steps of impregnating 0.1 to 100 parts by weight of at least one of radically polymerizable monomers, which contains a polymerization initiator, into the particles of PATE at a temperature, at which polymerization does not substantially start, in the presence of 100 parts by weight of PATE having a repeating unit of

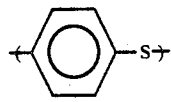

as a main constituent and heating the system to a temperature at which said monomer can polymerize and (3) a polymer alloy composition of PATE prepared by adding a fibrous filler and/or an inorganic filler to the polymer alloy.

PATE

PATE used in the present invention is a PATE having a repeating unit of —Ar-S— (wherein Ar is an arylene group).

Usually, PATE having a repeating unit of

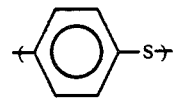

as a main constituent is preferable. The words "having as a main constituent" in the present invention means that PATE has a repeating unit of

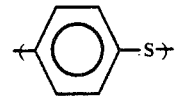

not less than 60 mol %, preferably not less than 75 mol % among the total number of the repeating unit of —Ar-S—.

PATE having the repeating unit of

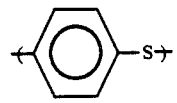

as a main constituent is preferable from a view point of physical properties such as heat-resistance, moldability, mechanical properties. PATE according to the present invention is the PATE having the repeating unit of

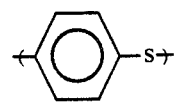

as the main constituent.

As the arylene group (—Ar—), other than paraphenylene group, metaphenylene group,

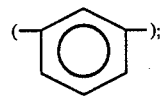

ortho-phenylene group,

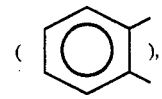

alkyl substituted phenylene group,

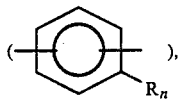

wherein R is an alkyl group (preferably an alkyl group of $C_1$ to $C_6$) and n is an integer of 1 to 4; p,p'-diphenylene sulfone group, (—⌬—SO$_2$—⌬—); p,p'-biphenylene group, (—⌬—⌬—); p,p'-diphenylene ether group, (—⌬—O—⌬—);

p,p'-diphenylene carbonyl group,

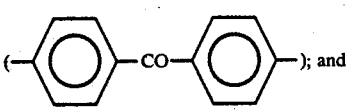); and naphthalene group, 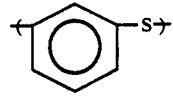 can be used.

From the view point of processability, copolymer containing different kind of repeating unit is preferable to a homopolymer consisting only of the repeating unit of

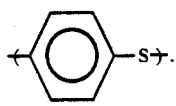

As the copolymer, a copolymer of

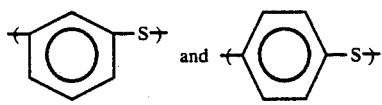

is preferred. Particularly, those containing the respective repeating units in a block form is preferred to those containing them in a random form (for example, as described in EPC Application No. 166,451), namely, a block copolymer having para-phenylene sulfide as a main constituent substantially consisting of a repeating unit (A),

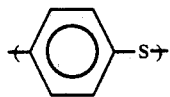

and a repeating unit (B),

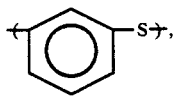

the repeating unit (A) existing in the polymer chain as a block, which has 20 to 5,000 of the repeating units, having a molar fraction of the repeating unit (A) in the range of 0.50 to 0.98, melt viscosity ($\eta^*$) of 50 to 100,000 poise (hereinafter the melt viscosity in the present invention is the value measured at 310° C. and under a shearing rate of 200/second unless mentioned otherwise), and further having the following properties:

(a) the glass-transition temperature (Tg) of 20° to 80° C., (b) the crystal melting point (Tm) of 250° to 285° C., and (c) the crystallization index (CI) of 15 to 45 (this value is measured with the thermally treated material of unstretched and nonoriented).

the block copolymer can be used in a remarkable excellence as compared to the random copolymer in physical properties, such as heat-resistance and mechanical properties. It is preferable that content of the repeating unit of

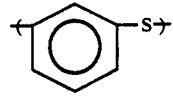

in the block copolymer is 5 to 40 mol %, particularly preferable 10 to 25 mol %.

As PATE in the present invention, those having substantially linear structure are preferred in respect to the processability and the physical properties.

However, within a range of not substantially impairing the processability and the physical properties, a cross-linked polymer obtained by using a cross-linking agent (for instance, about 1 mol % of 1,2,4-trihalobenzene) during polymerization, can also be used according to the present invention. The words "PATEs (those) having a substantially linear structure" does not mean the polymers obtained by curing such as oxidation cross-linking or thermal cross-linking but means the polymers obtained by condensation polymerization of a monomer, substantially bifunctional.

As the polymer of the present invention, cured PATE is also usable, however, uncured PATE is preferable.

As PATE of the present invention, those having a melting point of over 250° C. are preferable, because when the melting point is not higher than 250° C., the characteristic property as a heat-resistant polymer is missed.

The PATE which is preferable for the present invention can be economically produced by the process described in, for instance, U.S. Pat. No. 4,645,826 applied by the present inventors. Otherwise, a process described in U.S. Pat. No. 3,919,177 wherein PATE of a high molecular weight is obtainable by adding a large amount of a polymerization adjuvant such as a salt of a carboxylic acid, etc. to the polymerization system can be used. However, the latter process is unprofitable compared to the former one from the economical view point.

The process for producing PATE described in U.S. Pat. No. 4,645,826 is a process to produce a poly(arylene sulfide) having a melt viscosity of not less than 1,000 poise, which comprises the following two steps:

(1) a step of forming a poly(arylene sulfide) of a melt viscosity of 5 to 300 poise in a reaction of an alkali metal sulfide and a dihaloaromatic compound in the presence of at least 0.5 to 2.4 mol of water per mol of the alkali metal sulfide at a conversion ratio of 50 to 98 mol % of the dihaloaromatic compound by reacting at a temperature of 180° to 235° C., and (2) a step of continuing the reaction by adjusting the water content to 2.5 to 7.0 mol per mol of the alkali metal sulfide and increasing the reaction temperature to 245° to 290° C.

One of the characteristic features in the production of the polymer alloy according to the present invention is, in the presence of PATE particles, after impregnating the PATE particles with one or more radically polymerizable monomers containing a polymerization initiator at a temperature at which the polymerization does not start substantially, to increase the temperature of the system and perform the polymerization. By performing the polymerization, the most part of the monomer polymerizes in internal pores of the PATE particles.

Generally, PATE produced by the process described in U.S. Pat. No. 3,354,129 consists of fine powder and have certain amount of internal pores in the polymer particles.

PATE usable in the present invention is not necessary to be limited to certain PATE as far as the radically polymerizable monomer can polymerize in the internal pores of PATE particles, however, in order to polymerize a large amount of the monomer in the pores of the particles, it is preferable to use PATE having a high specific surface area, namely, which is obtained by the method U.S. Pat. Nos. 4,645,826 and 3,919,177 and in EP. Pat. No. 166,451 is preferable to PATE having a high specific surface area.

The process described in EP No. 166,451 is to produce a block copolymer of poly(para-phenylene sulfide) and poly(meta-phenylene sulfide), and comprises the first step wherein a reaction liquid (C), containing a polymer of paraphenylene sulfide consisting of the repeating unit (A),

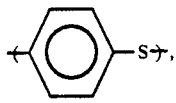

is formed by heating a non-protonic, polar organic solvent containing paradihalobenzene and an alkali metal sulfide, and the second step wherein a dihaloaromatic compound substantially consisting of meta-dihalobenzene is added to the reaction liquid (C) and the mixture is heated in the presence of the alkali metal sulfide and the non-protonic, polar organic solvent to form a block copolymer substantially consisting of the repeating unit (A) and the repeating unit (B),

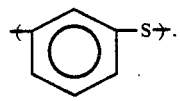

The first step is carried out until the degree of polymerization of the repeating unit (A) becomes 20 to 5,000 in average and the second step is carried out until molar fraction of the repeating unit (B) of the copolymer becomes 0.02 to 0.50.

Although the size and the shape of PATE particles which can be used in the present invention is not particularly limited, in respect to easiness of performing polymerization and handling after polymerization, it is preferable that PATE particle is granular. Particularly, the granular particles having an average diameter of not less than about 100 $\mu$m to not more than about 3,000 $\mu$m can preferably be used and the granules of about 200 to about 2,000 $\mu$m are more preferable.

When the mean diameter of the particle is not more than 100 $\mu$m, its handling becomes troublesome and on the other hand, when the mean diameter is not less than 3,000 $\mu$m, the particles become unsuitable for stirring and transporting the polymer slurry.

In addition, in order to radically polymerize the monomer in the pores of the PATE particles, it is preferable to use the PATE particles having a high specific surface area and interior pore ratio.

When the specific surface area is measured by BET method using nitrogen adsorption as an index representing the porosity of the particle, the specific surface area of the particles, in the dry state, of the present invention is preferable not less than 3 $m^2/g$, more preferable not less than 5 $m^2/g$ and particularly preferable not less than 10 $m^2/g$. When the specific surface area is extremely small, the part of the radically polymerized monomer outside the pores of the particles becomes higher and it becomes difficult to obtain a uniform dispersion of the polymerized monomer suitable for the polymer alloy of the present invention.

The particles of PATE obtained by the above-mentioned, publicly known process have slight alkalinity. Although such particles can also be used as they are, when the particles are preliminarily treated with an aqueous solution of an acid or of a strong-acid-weak-base salt, it can prevent discoloration of the particles in the latter steps. As the acid, hydrochloric acid, sulfuric acid, etc. may be mentioned and as the salt, ammonium chloride, ammonium sulfate, etc. may be mentioned (refer to EP Pat. No. 216,116).

As a solvent for the aqueous solution, water or a mixed solvent of alcohol, ketone or ether with water, as a main component, is used. It is preferable that alcohol, ketone and ether have the sufficient compatibility with water to form an aqueous solution and have enough solubility to the acid and the salt.

Further, although PATE in a wet state come through the various steps after polymerization may be used, dry powder of PATE is preferable because of the easiness of permeation and absorption of the radically polymerizable monomer into the fine pores of PATE particles.

RADICALLY POLYMERIZABLE MONOMER

The radically polymerizable monomer of the present invention is a monomer which can be (co)polymerized radically, for instance, olefin monomers, aromatic vinyl monomers, aromatic divinyl monomers, acrylic ester monomers, methacrylic ester monomers, multifunctional acrylic ester monomers, multifunctional methacrylic ester monomers, halogen-containing monomers, amino group-containing monomers, carboxylic group-containing monomers, maleimide monomers, diene monomers, vinyl ester monomers, nitrile monomers, vinyl ketone monomers, allyl group-containing monomers, maleic anhydride, etc.

As the olefin monomers, ethylene, propylene, isobutylene, etc. may be mentioned; as the aromatic vinyl monomers, styrene, $\alpha$-methylstyrene, $\alpha$-vinylnaphthalene, $\beta$-vinylnaphthalene, 2-isopropenylnaphthalene, p-methylstyrene may be mentioned; as the aromatic divinyl monomers, divinylbenzene, etc. may be mentioned; as the acrylic ester monomers, methyl acrylate, ethyl acrylate, n-propyl acrylate, isopropyl acrylate, n-butyl acrylate, sec-butyl acrylate, hexyl acrylate, n-octyl acrylate, 2-ethylhexyl acrylate, methoxypolyethylene glycol acrylate, etc. may be mentioned; as the methacrylic ester monomers, methyl methacrylate, ethyl methacrylate, n-butyl methacrylate, methoxypolyethylene glycol methacrylate, glycidyl methacrylate, etc. may be mentioned; as the multifunctional acrylic ester monomers, allyl acrylate, vinyl acrylate, trimethylolpropane triacrylate, ethylene glycol diacrylate, diethylene glycol diacrylate, triethylene glycol diacrylate, polyethlene glycol diacrylate, neopentyl glycol diacrylate, etc. may be mentioned; as the multifunctional methacrylic ester monomers, ethylene glycol dimethacrylate, diethylene glycol dimethacrylate, triethylene glycol dimethacrylate, neopentyl glycol dimethacrylate, trimethylolpropane trimethacrylate, etc. may be mentioned; as the halogen containing monomers, vinyl chloride, vinylidene chloride, vinyl fluoride, vinylidene fluoride, trifluorochloroethylene, tetrafluoroethylene, hexafluoropropylene, etc. may be mentioned; as the amino group-containing monomers, acrylamide, methacrylamide etc. may be mentioned; as the carboxylic group-containing monomers, monobutylitaconic acid, monoethylitaconic acid, monomethylmaleic acid, monoethylmaleic acid, etc. may be mentioned; as the maleimide monomers, maleimide, N-methylmaleimide, N-phenylmaleimide, etc. may be mentioned; as the diene monomer, butadiene, isoprene, chloroprene, etc. may be mentioned; as the vinyl ester monomers, vinyl acetate, vinyl butyrate, etc. may be mentioned; as the nitrile monomers, acrylonitrile, methacrylonitrile, etc. may be mentioned; as the vinyl ketone monomers, methylvinylketone, ethylvinylketone, phenylvinylketone, isopropylvinylketone, etc. may be mentioned; and as the allyl group-containing monomers, allyl acrylate, diallyl phthalate, triallyl cyanurate, triallyl isocyanurate, etc. may be mentioned. One of more of these monomers can be used.

When a suitable amount of the multifunctional monomer is used as the radically polymerizable monomer, an entanglement of PATE and polymerized monomer increases, and accordingly, an improvement of close adhesion at the interface of PATE and the polymerized monomer can be expected.

The amount of one or more of the radically polymerizable monomers, which is radically polymerized in the presence of the PATE particles, is 0.1 to 100 parts by weight per 100 parts by weight of PATE.

When the monomer amount is not more than 0.1 part by weight, the effect of improving the impact-strength, the processability, the surface properties, etc. is not sufficient, and on the other hand, when the amount is not less than 100 parts by weight, the ratio of the monomer polymerized outside the pores of the PATE particles is increased. Accordingly, the effect of the polymerization within the PATE particles becomes smaller and at the same time, the chance of spoiling heat-resistance of PATE itself and losing easiness of handling of PATE, is increased.

The amount of the radically polymerizable monomer is preferably 5 to 70 parts by weight and more preferably 10 to 50 parts by weight.

POLYMERIZATION OF THE RADICALLY POLYMERIZABLE MONOMER

In the present invention, after impregnating the particles of PATE with the radically polymerizable monomer containing a polymerization initiator at a temperature, at which polymerization does not start substantially, the radical polymerization is carried out by increasing the temperature of the system. More in detail, by taking a suitable procedure, which will be described later, it is possible to polymerize most part of the monomer within the pores of the PATE particles (intra-particle polymerization). By polymerizing most part of the monomer within the pores, the following remarkable effect is manifested:

(1) Since, in the polymer alloy of PATE according to the present invention, the dispersion of the radically polymerized monomer is remarkably fine and is uniformly dispersed, compared to a polymer alloy obtained by simply melt-kneading PATE and a polymer obtained by polymerizing the radically polymerizable monomer only, intra-particle polymerization of the present invention is quite effective of giving the impact strength to the product.

(2) Since the radically polymerized monomer exists in the form of filling up the pores of the PATE particles, the fluidity of the obtained composition (the particles of the polymer alloy) is relatively close to the fluidity of the original PATE particles, and the handling of the composition is easy.

(3) Moreover, it is surprising enough that the thermal stability of the polymer alloy according to the present invention is remarkably excellent at the time of melt-processing as compared to a composition obtained by simply mixing PATE with a polymer obtained separately by radical polymerization, As the initiator of radical polymerization, the oil-soluble initiator which dissolves in the radically polymerizable monomer is preferable. The polymerization is started after impregnating the particles of PATE with the radically polymerizable monomer in which a polymerization initiator has been dissolved.

Although the radical polymerization can be performed even without a dispersion medium, a method of dispersing PATE particles impregnated with the radically polymerizable monomer containing the polymerization initiator in water and polymerizing the monomer is preferable from the view points of the easiness of controlling the polymerization reaction, the uniform dispersion of the radically polymerized monomer in PATE and the easiness of the handling of the composition after polymerization.

In order to stabilize the dispersion of PATE particles impregnated with the radically polymerizable monomer, a small amount of a suspending agent, namely, polyethylene oxide, methylcellulose, partially saponified polyvinyl alcohol, etc. can be used.

In order to polymerize the radically polymerizable monomer within the pores of PATE particles, it is preferable to complete the permeation of the monomer in the pores of the PATE particles before starting the polymerization reaction. Moreover, in order to accelerate the permeation of the radically polymerizable monomer in the pores of the PATE particles, (1) it is preferable to sufficiently remove air among the PATE particles, thereby placing the particles in reduced pressure before contacting the particles with the monomer (if the PATE particles are dispersed in the dispersion medium, a pressure of the system is reduced close to the vapor pressure of the medium), and then to bring the radically polymerizable monomer into contact with the PATE particles which are in reduced pressure, (2) then, the pressure of the system is increased by an inert gas when the permeation of most part of the monomer into the pores is expected (10 to 120 minutes is sufficient). By such a procedure, the permeation of the monomer into the deep part of the pores can be done more completely. Accordingly, such a procedure is particularly preferable.

The polymer alloy obtained by this method (1) and (2) of polymerization with the PATE particles is remarkably excellent in the physical properties such as impact strength, etc. as compared to the composition obtained by mixing the polymer, obtained by singly polymerizing the radically polymerizable monomer, with the PATE particles.

Further, according to the intra-particle polymerization, the troublesome procedures, such as mixing the rubber polymerized separately, become unnecessary and the polymer alloy can be obtained at an economical cost.

FILLER

The polymer alloy alone according to the present invention can be processed into a molded product excellent in impact strength, etc. by various melt-processing methods.

However, generally, the polymer alloy according to the present invention is used as a combination with various filler. As the filler, fibrous filler, inorganic filler, various synthetic resins, elastomers, etc. can be mentioned.

(i) Fibrous Filler

As the fibrous filler, fibers of glass, carbon, graphite, silicon carbide, silica, alumina, zirconia, potassium titanate, calcium sulfate, calcium silicate, aramide, wollastonite, etc. can be used.

(ii) Inorganic Filler

As the inorganic filler, powder of talc, mica, kaoline, clay, magnesium phosphate, magnesium carbonate, calcium carbonate, calcium silicate, calcium sulfate, silicon oxide, aluminum oxide, titanium oxide, chromium oxide, iron oxide, copper oxide, zinc oxide, carbon, graphite, boron nitride, molybdenium disulfide, silicon and others can be used.

(iii) Synthetic Resin and Elastomer

Synthetic resin such as polyolefin, polyester, polyamide, polyimide, polyether imide, polycarbonate, polyphenylene ether, polysulfone, polyether sulfone, polyether ether ketone, polyether ketone, polyarylene, poly(tetrafluoroethylene), poly(difluoroethylene), polystyrene, ABS, epoxy resin, silicone resin, phenol resin, and urethane resin. or elastomer such as polyolefin rubber, fluorocarbon rubber, and silicone rubber can be used as a filler.

Among these fillers of the synthetic resin and the elastomer, polyolefin, polyester, polyether imide, polysulfone, polyether sulfone, polyether ether ketone, polyether ketone and polystyrene are particularly preferable from the view point of physical properties.

Since the adding amount of the fibrous filler and/or the inorganic filler is allowable unless the obtained mixture of the filler and the polymer alloy can not be melt-processed, it is meaningless to limit the amount of addition of the fibrous filler and/or the inorganic filler decidedly.

However, from the view point of fluidity of the composition during melt-processing, it is preferable to add the fibrous filler up to 60% by volume, the inorganic filler up to 75% by volume and the mixture of the fibrous and inorganic fillers up to 70% by volume.

When the fibrous filler and/or the inorganic filler are added in an amount over the range, the fluidity of the molten composition is prone to become worse.

A synthetic resin and an elastomer should be mixed with the polymer alloy in an amount not to unduly spoil the properties of the alloy. Accordingly, it is generally preferable that their amount to be mixed is smaller than an amount of the polymer alloy.

Moreover, to the composition prepared by adding the synthetic resin and/or the elastomer to the polymer alloy, the fibrous filler and/or the inorganic filler can be added, if necessary.

Other than these fillers, a small amount of an additives, such as, a heatstabilizer, a light-stabilizer, a rust inhibitor, a coupling agent, a release agent, a lubricant, a coloring agent, a flame retardant, a foaming agent and an antistatic agent can be added to the polymer alloy.

The content of a heatstabilizer to 100 parts by weight of the radically polymerized monomer is preferably 0.01 to 10 parts by weight and more preferably 0.05 to 5 parts by weight. When the content is below 0.01 part by weight, its stabilizing effect is insufficient. On the other hand, when the content is over 10 parts by weight, its uneconomical.

MIXING OF THE POLYMER ALLOY OF INTRA-PARTICLE-POLYMERIZED PATE WITH THE FILLER AND THE ADJUVANT

Since particles of the polymer alloy of PATE in which the radically polymerizable monomer is intra-particle-polymerized according to the present invention have the properties close to that of the particles of PATE alone, for instance, a good fluidity, the particles of the polymer alloy can be handled in the same easiness as PATE prepared in a conventional way.

In a melt-kneading process, the polymer alloy of PATE alone, or the polymer alloy diluted with PATE, used as the starting polymer of the present invention, to adjust content of the radically polymerized monomer, can be supplied to an extruder, etc. together with an other synthetic resin, a filler, an additive according to necessity.

MOLDED PRODUCTS

The polymer alloy of PATE or the composition thereof according to the present invention can be molded in the products, of which various physical properties, mechanical properties and processing properties are improved, by injection-molding, extrusion-molding, compression-molding and blow-molding.

Further, the polymer alloy or the composition thereof is used as the raw material for various molded products such as an encapsulating molded product, sheets, films, plates, pipes, rods, profile and bottles.

In the present invention, since PATE is favorably blended with the radically polymerized monomer, namely, the radically polymerized monomer is dispersed finely in PATE and its affinity to PATE at the interface between them is good, the molded product having the largely improved impact strength and other physical properties can be obtained from the polymer alloy of PATE or the composition thereof.

For instance, the molded product of the polymer alloy of the present invention, which is obtained by polymerizing an acrylic ester monomer in the presence of PATE particles, is excellent in impact-strength, particularly after being annealed, as compared to the molded product of a simple mixture of PATE and a polymer of an acrylic ester. Further, an amorphous sheet of the polymer alloy of the present invention, which is obtained by polymerizing styrene in the presence of PATE particle, is excellent in its surface properties and transparency, as compared to an amorphous sheet of a physical melt mixture of PATE and polystyrene, and moreover, the film of the polymer alloy shows largely improved surface roughness and sliding property.

Still further, in the present invention, since a molded product of the polymer alloy, which is obtained by polymerizing divinylbenzene in the presence of PATE particles, has modified melt flow properties and stronger melt-elasticity, as compared to a molded product of a simple mixture of a polymer of divinylbenzene and PATE, the polymer alloy of the present invention can improve an anti-flash property on injection molding.

The present invention will be explained more in detail while referring to Examples and Experimental Examples as follows, however, the present invention is not limited to these Examples.

EXPERIMENTAL EXAMPLES

SYNTHETIC, EXPERIMENTAL EXAMPLE 1

Into a titanium-lined autoclave, 423.2 kg of hydrated sodium sulfide (purity of 46.13%) and 927 kg of N-methylpyrrolidone (hereinafter referred to as "NMP") were introduced, and by heating the content to about 203° C., 167 kg of water were distilled out. Then, 65.4 kg of NMP were further introduced into the autoclave.

Secondly, 365.0 kg of p-dichlorobenzene were introduced into the autoclave.

After reacting the content for 5 hours at 220° C., 92.5 kg of water were additionally introduced in the autoclave, and the content was polymerized for 0.75 hour at 265° C. and for 4 hours at 254° C.

The reaction liquid was sieved through a screen of 0.1 mm opening to separate the granular polymer only, and the obtained polymer was washed with acetone and then with water to obtain washed polymer.

After separating a part of the washed polymer, most part of the washed polymer was immersed in an aqueous 2% solution of $NH_4Cl$ to treat the polymer for 30 minutes at 40° C., and the treated polymer was washed with water and then dried at 80° C. under a reduced pressure to obtain PATE-A.

PATE-A has a melt viscosity of 1,600 poise, an average particle diameter of 640 μm, a specific surface area of 43 $m^2/g$, a melting point Tm of 289° C. and a bulk density of 36 g/dl.

SYNTHETIC, EXPERIMENTAL EXAMPLE 2

Half of the separated washed polymer in Synthetic, Experimental Example 1, which was not immersed into the aqueous 2% solution of $NH_4Cl$, was dried at 80° C. under a reduced pressure to obtain PATE-B.

Further, the remaining half of the separated washed polymer was immersed into an aqueous solution of HCl (pH: about 1) for 30 minutes at room temperature, and after sufficiently washing the immersed polymer with water, the washed polymer was dried at 80° C. under a reduced pressure to obtain PATE-C.

SYNTHETIC, EXPERIMENTAL EXAMPLE 3

Into an autoclave, 423.5 kg of hydrated sodium sulfide (purity of 46.04%) and 925 kg of NMP were introduced, and the content of the autoclave was heated to about 203° C. to distill out 165 kg of water. Then, 65 kg of NMP were introduced additionally into the autoclave.

Secondly, 365.3 kg of p-dichlorobenzene were introduced in the autoclave, and after reacting the content for 5 hours at 220° C., 90 kg of water were introduced additionally into the autoclave. The content was heated to 260° C. to polymerize for 1.5 hours and then the polymerization was continued further for 3.5 hours at 240° C. By sieving the reaction liquid through the screen of 0.1 mm opening, the granular polymer was recovered. By repeatedly washing the recovered polymer with methanol and water, the washed polymer was obtained. The washed polymer was immersed into an aqueous 2% solution of $NH_4Cl$ for 30 minutes at 40° C. and the polymer was washed with water and the most part of the washed polymer was dried to obtain PATE-D.

PATE-D has a melt-viscosity of 1,900 poise [when measured at a shearing rate of 1,200/second, melt viscosity was 1,400 poise], a specific surface area of 48 $m^2/g$, a melting point of 284° C., a bulk density of 36 g/dl and an average particle diameter of 620 μm.

A part of the washed polymer was preserved in a wet state as PATE-E.

SYNTHETIC, EXPERIMENTAL EXAMPLE 4

Into an autoclave made of glass, 500 g of 2-ethylhexyl acrylate and 2.5 g of α,α'-azobisisobutyronitrile were introduced and after substituting an atmosphere of the vessel by gaseous nitrogen, the vessel was immersed into a water bath at 60° C. to react the content for 10 hours under stirring. Thereafter, the content was heated to about 90° C. for 10 hours to complete the reaction. After cooling the system, a massive rubber (Mod-1) was obtained.

SYNTHETIC, EXPERIMENTAL EXAMPLE 5

Into an autoclave of 10 liters, 4,500 g of deionized water, 10 g of sodium laurylbenzenesulfonate, 1,050 g of 2-ethylhexyl acrylate, 11.0 g of trimethylolpropane triacrylate as a cross-linking agent, 5.25 g of diisopropylbenzene hydroperoxide as a polymerization initiator, 5.25 g of Rongalit, 0.033 g of ferrous sulfate, 0.0504 g of EDTA and 2.1 g of sodium pyrophosphate were introduced and after substituting an atmosphere of the autoclave with gaseous nitrogen, the content was reacted for 10 hours at 50° C. Then, 435 g of methyl methacrylate, 4.0 g of trimethylolpropane triacrylate, 4.5 g of sodium laurylbenzenesulfonate, 2.25 g of diisopropylbenzene hydroperoxide, 2.25 g of Rongalit, 0.0144 g of ferrous sulfate, 0.0216 g of EDTA and 0.9 g of sodium pyrophosphate were added to the autoclave, and after substituting an atmosphere of the autoclave with gaseous nitrogen, the content was further reacted for 10 hours at 50° C.

After cooling the reactant, salting out the formed latex with an aqueous 5% solution of $CaCl_2$ and sufficiently washing the separated product with water, the product was dried to obtain a modifier (Mod-2).

EXAMPLES

A commercial PATE, a commercial modifiers, a filler, and a stabilizer, used in the following Examples and Comparative Examples were as follows:

PATE: Ryton P-4 (made by Phillips Petroleum Co.)
Modifier: TUFPRENE A (SBR rubber, made by ASAHI KASEI KOGYO Co., Ltd.) TAFMER-A (olefin rubber, made by MITSUI Petrochem. Co., Ltd.)
Filler: ECSO3T-717 (glass fiber of 13 μm in diameter, made by NIHON DENKI GARASU Co., Ltd.)
Stabilizer: IRGANOX 1010 (made by Ciba Geigy Co.)

The methods for measuring a melt-viscosity, a specific surface area, a bulk density and an average particle diameter in the present application are as follows:

Melt Viscosity:

Melt viscosity was measured by using CAPILOGRAPH (made by TOYO SEIKI Co.) at a temperature of 310° C. and a shearing rate of 200/second or 1,200/second; the nozzle being L/D=10 mm/1 mm.

Specific Surface Area:

Specific surface area was measured by using ACCUSORB 2100 (made by SHIMAZU SEISAKUSHO Co.) at a temperature of liquid nitrogen. The specific surface area was determined by BET method applying the adsorption of nitrogen.

Bulk Density:

Bulk density was measured according to Japanese Industrial Standards (JIS K-6721).

Average Particle Diameter:

Average particle diameter was measured by the dry screening method (6 to 8 sieves are used).

The particle diameter at which the cumulative percentage by weight of the polymer remaining on sieves became 50% by weight is taken as the average particle diameter.

Further, in order to prevent a generation of static electricity, a small amount of carbon black was added to the specimen.

EXAMPLE 1

Into an autoclave of 20 liters, 8.0 kg of deionized water and 2.5 kg of PATE-A were introduced and while stirring the content, pressure of the autoclave was reduced by using an aspirator. Into the autoclave, 500 g of 2-ethylhexyl acrylate, in which 1.5 g of $\alpha,\alpha'$-azobisisobutyronitrile had been dissolved, were introduced. Then, 1.0 kg of deionized water, in which 1 g of polyethylene oxide (ALCOX E-100, made by MEISEI Chem. Ind. Co., Ltd.), was additionally introduced thereinto. After stirring the content for about one hour at room temperature, the pressure of the autoclave was increased to 4.0 kg/cm$^2$ G by using gaseous nitrogen and then the temperature was increased to carry out the radical polymerization of the monomer. The reaction was performed first for 10 hours at 60° C. and then for 2 hours at an elevated temperature of 105° C.

After cooling the autoclave, the formed polymer was collected with a screen of 0.1 mm opening and the collected polymer was washed with water and dried. The obtained polymer composition (IPP-1) was not sticky and has a good fluidity. Although the appearance of the polymer composition was almost the same as that of PATE-A, the bulk density thereof showed an increase to 45 g/dl. Further, the reaction ratio of 2-ethylhexyl acrylate was nearly 100%.

After blending 1,800 g of the polymer composition [consisting of 1,500 g of PATE-A and 300 g of poly(2-ethylhexyl acrylate) with 1,200 g of glass fiber and 6 g of a stabilizer in a blender], the mixture was supplied to a biaxial kneading extruder.

The supplied mixture was melt-kneaded at about 320° C., extruded in a strand form and cut into pellets. The obtained pellets were injection-molded at about 320° C. to obtain the test pieces for measuring the physical properties of the product.

In order to evaluate the toughness and the impact-strength of the product, the maximum flexural strain and the Izod' impact strength of the test pieces were measured according to the methods of ASTM D-790 and ASTM D-256.

At the same time, in order to evaluate a heat-resistant property of the product, the heat distortion temperature (HDT) of the test pieces was measured according to the method of ASTM D-648. The results are collectively shown in Table 2.

EXAMPLE 2

By the same procedures as in Example 1, while fixing the weight ratio of PATE to polyacrylic ester rubber at 5:1 and only changing the composition of polyacrylic ester rubber as is shown in Table 1, PATE composition (IPP-2 to IPP-4), wherein the rubber was polymerized inside the PATE particles, were obtained. Next, after mixing the additives, such as a glass fiber (hereinafter referred to as "GF"), a stabilizer, with the PATE composition by the same method as described in Example 1, the mixture was pelletized and injection-molded to obtain the test pieces. The test pieces were tested and the physical properties of the product were determined. The results are shown collectively in Table 2.

EXAMPLE 3

Into an autoclave of 20 liters, 9 kg of deionized water, in which 3 g of poly(ethylene oxide) [ALCOX E-100] had been dissolved and 2.5 kg of Ryton P-4 (specific surface area of 0.95 m$^2$/g and bulk density of 44 g/dl) were introduced, and while stirring the content, pressure of the autoclave was reduced sufficiently by an aspirator.

500 g of 2-ethylhexyl acrylate, in which 1.5 g of $\alpha,\alpha'$-azobisisobutyronitrile had been dissolved, were additionally introduced into the autoclave.

After continuing the stirring for one hour, the pressure of the autoclave was increased to 4 kg/cm$^2$ G with gaseous nitrogen. The reaction was carried out at first for 10 hours at 60° C. and then for 2 hours at an elevated temperature of 105° C. After cooling the autoclave, the formed polymer was collected by suction-filtration of the reactants.

Because of a small amount of pores within Ryton P-4 particles, most part of 2-ethylhexyl acrylate could not enter into the particle and the polymer alloy was obtained as rubber balls which sizes are few mm to 1 cm in diameter containing Ryton P-4 inside and fine powder (IPP-5).

1,800 g of the obtained, intra-particle-polymerized Ryton P-4 composition [PATE/poly(2-ethylhexyl acrylate)=1,500 g/300 g], were blended to obtain a mixture in the ratio of IPP-5/GF/Stabilizer=1,800 g/1,200 g/6 g. From the mixture, test pieces were prepared in the same manner as in Example 1, and the physical properties of the product were determined. The results are shown in Table 2.

COMPARATIVE EXAMPLE 1

1,800 g of PATE-A and 1,200 g of a glass fiber mixed by a blender and test pieces were prepared from the mixture in the same procedures as in Example 1. The test pieces were tested to determine the physical properties of the product. The results are shown in Table 2.

COMPARATIVE EXAMPLE 2

While using a commercial modifier, a mixture was prepared in the following mixing ratio:

PATE-A/commercial modifier/GF/stabilizer=1,500 g/300 g/1,200 g/6 g.

Test pieces of the mixture were prepared in the same procedures as in Example 1 and the test pieces were tested to determine the physical properties of the product. The results are collectively shown in Table 2.

COMPARATIVE EXAMPLE 3

300 g of the massive poly(2-ethylhexyl acrylate) (Mod-1) obtained in Synthetic, Experimental Example 4 were freeze-pulverized and the powder was mixed well with 1,500 g of PATE-A. Further, after adding 1,200 g of the glass fiber and 6 g of the stabilizer to the powder, the mixture was blended with a blender. After pelletizing the blended mixture, test pieces were prepared from the pellets and tested to determine the physical properties of the product. The results are shown in Table 2.

COMPARATIVE EXAMPLE 4

In the same manner as in Comparative Example 2 except for using the modifier (Mod-2) obtained in Synthetic, Experimental Example 5 instead of the commercial modifier, test pieces were prepared and the physical properties of the test pieces were determined. The results are shown in Table 2.

COMPARATIVE EXAMPLE 5

After freeze-pulverized 600 g of the rubber (Mod-1) obtained in the same way as in Synthetic, Experimental Example 4, the pulverized rubber was well mixed with 3,000 g of Ryton P-4. To the mixture, 2,400 g of the glass fiber were added and blended in a blender. After pelletizing the blended material in the same manner as in Example 1, test pieces were prepared from the pellets and tested to determine the physical properties of the product. The results are shown in Table 2.

Incidentally, in Table 1, the composition ratios of IPPs 1 to 5 and modifiers 1 to 2 are shown.

EXAMPLE 4

TABLE 1

| Code Number | Weight Ratio of Components Charged |
| --- | --- |
| IPP-1 | PATE-A/2EHA = 50/10 |
| IPP-2 | PATE-A/2EHA/TMPTA = 50/9.9/0.1 |
| IPP-3 | PATE-A/2EHA/St = 50/9/1 |
| IPP-4 | PATE-A/BA = 50/10 |
| IPP-5 | Ryton P-4/2EHA = 50/10 |
| Mod-1 | 2EHA = 100 |
| Mod-2 | 2EHA/MMA/TMPTA = 70/29/1 |

2EHA: 2-ethylhexyl acrylate
TMPTA: trimethylolpropane triacrylate
St: styrene
BA: butyl acrylate
MMA: methyl methacrylate
PATE-A: PATE treated with $NH_4Cl$
Ryton P-4: Commercial PATE

TABLE 2

| Example | Composition (weight ratio) | Max. Blend (mm) | Izod Impact Strength (*1) (kg·cm/cm) | H.D.T. (°C.) (*2) | Remarks |
| --- | --- | --- | --- | --- | --- |
| Example 1 | IPP-1/GF = 60/40 | 8.1 | 14.9 | 257 | Intra-Particle Polymerization |
| Example 2-1 | IPP-2/GF = 60/40 | 8.5 | 13.4 | 256 | Intra-Particle Polymerization |
| Example 2-2 | IPP-3/GF = 60/40 | 8.2 | 12.4 | 256 | Intra-Particle Polymerization |
| Example 2-3 | IPP-4/GF = 60/40 | 8.1 | 13.8 | 255 | Intra-Particle Polymerization |
| Example 3 | IPP-5/GF = 60/40 | 7.5 | 11.5 | 253 | Intra-Particle Polymerization (Ryton P-4 as PATE) |
| Com. Ex. 1 (*3) | PATE-A/GF = 60/40 | 6.1 | 7.7 | 263 | Control |
| Com. Ex. 2-1 | PATE-A/SBR Rubber/GF = 50/10/40 | 6.4 | 6.1 | 250 | Blend with a commercial modifier |
| Com. Ex. 2-2 | PATE-A/Olefin Rubber/GF = 50/10/40 | 6.3 | 7.8 | 251 | Blend with a commercial modifier |
| Com. Ex. 3 | PATE-A/Mod-1/GF = 50/10/40 | 8.0 | 11.0 | 256 | Blend with a separately polymerized modifier |
| Com. Ex. 4 | PATE-A/Mod-2/GF = 50/10/40 | 7.9 | 8.1 | 255 | Blend with a separately polymerized modifier |
| Com. Ex. 5 | Ryton P-4/Mod-1/GF = 50/10/40 | 6.9 | 7.8 | 252 | Blend of Ryton P-4 and a modifier |

(*1)v-notch, 23° C.
(*2)Thickness of the specimen = 3 mm.
(*3)Com. Ex. means Comparative Example.

Into an autoclave of 20 liters, 8.0 kg of deionized water and 2.5 kg of PATE-A were introduced and while stirring the content, the pressure of the autoclave was reduced sufficiently by an aspirator. Into the autoclave, 1.5 kg of 2-ethylhexyl acrylate, in which 4.5 g of α,α'-azobisisobutyronitrile had been dissolved, were introduced.

After continuing the stirring for one hour at room temperature, 1.0 kg of deionized water, in which 1 g of poly(ethylene oxide) had been dissolved, was added and the pressure of the autoclave was increased to 4.0 kg/cm² G by gaseous nitrogen.

The reaction of the content was carried out first at 60° C. for 10 hours and then at an elevated temperature of 105° C. for 2 hours.

After cooling the autoclave, the formed polymer was collected by a screen of 0.1 mm opening, washed with water and dried. The ratio of reaction of 2-ethylhexyl acrylate was nearly 100%.

The polymer alloy composition obtained by intra-particle polymerization was not sticky and had a good fluidity. Although the appearance of the polymer alloy composition was almost as same as that of PATE-A, the bulk density of the polymer alloy composition showed an increase to 61 g/dl.

By diluting 800 g of the obtained polymer alloy composition [PATE-A/poly(2-ethylhexyl acrylate)=500 g/300 g] with 1,000 g of PATE-A, 1,800 g of the PATE composition (IPP-6) were obtained.

Further, 1,200 g of the glass fiber and 6 g of the stabilizer were added to the obtained PATE composition and the mixture was blended by a blender. Thereafter, test pieces were prepared from the blended material in the same procedures as in Example 1, and the test pieces were tested to determine the physical properties of the product. The results are shown in Table 3.

The PATE composition prepared by diluting a polymer alloy composition, which was obtained by the intra-particle polymerization at a weight ratio of PATE/polyacrylic ester rubber=5/3, with PATE to make the ratio of PATE/polyacrylic ester rubber of 5/1 had a lower impact strength as compared to a polymer alloy composition prepared by intra-particle polymerization only at the ratio of PATE/polyacrylic ester rubber of 5/1. As a result of observation by an electronmicroscope, it was found that the diameter of the dispersed rubber particle of the composition diluted with PATE was larger than that of the polymer alloy composition, both of which have the same ratio of components.

EXAMPLE 5

Into an autoclave of 20 liters, 8.0 kg of deionized water and 2.5 kg of PATE-A were introduced and while stirring the content, the atmosphere of the autoclave was substituted by gaseous nitrogen. Into the autoclave, 1.5 kg of 2-ethylhexyl acrylate, in which 4.5 g of $\alpha,\alpha'$-azobisisobutyronitrile had been dissolved, were introduced.

After continuing the stirring for one hour at room temperature, the content was heated to 60° C. to react for 10 hours, then was kept for 2 hours at an elevated temperature of 105° C.

After cooling the autoclave, the formed polymer was collected by a screen of 0.1 mm opening, washed with water and dried. The ratio of reaction of 2-ethylhexyl acrylate was nearly 100%, however, because of not performed the procedures to complete the intra-particle permeation of 2-ethylhexyl acrylate, lumps of rubber containing PATE particles adhered to the autoclave wall around the gas-liquid interface and although the polymer was collected in a granular form, it was sticky and had a reduced fluidity.

The lumps of rubber were freeze-pulverized and mixed with the polymer obtained in a granular form and obtained a polymer composition.

800 g of the polymer alloy composition [PATE-A/poly(2-ethylhexyl acrylate)=500 g/300 g] were diluted by 1,000 g of PATE-A to obtain the PATE composition (IPP-7). Further, 1,200 g of the glass fiber and 6 g of the stabilizer were added to the PATE composition and blended with a blender.

Then, test pieces were prepared from the blended material and tested to determine the physical properties of the product. The results are shown in Table 3.

EXAMPLE 6

In the same procedures as in Example 1 except for using PATE-C, which had been treated by hydrochloric acid, instead of PATE-A, a composition (IPP-8) was obtained by carrying out the intra-particle polymerization of 2-ethylhexyl acrylate. The composition obtained was mixed with a filler, pelletized and made to test pieces. The determinations of the physical properties (Impact strength and maximum flexural strain) were carried out on the pieces without annealing (as molded) and the pieces with annealing for 4 hours at 204° C. (annealed). The results are collectively shown in Table 4.

EXAMPLE 7

In the same procedures as in Example 1 except for using PATE-B, which had not been treated by hydrochloric acid nor NH$_4$Cl, instead of PATE-A, a polymer composition (IPP-9) was obtained by carrying out the intra-particle polymerization of 2-ethylhexyl acrylate. The polymer composition obtained was mixed with a filler, pelletized and made to test pieces.

TABLE 3

| Number | Composition (Weight Ratio) | Max. Flex. Strain (mm) | Izod Strength(*1) (kg · cm/cm) | H.D.T. (°C.) | Remarks |
|---|---|---|---|---|---|
| Example 4 | IPP-6/GF = 60/40 | 8.4 | 13.3 | 257 | diluted with PATE |
| Example 5 | IPP-7/GF = 60/40 | 8.2 | 12.4 | 256 | diluted with PATE |

(*1)V-notch, 23° C.

TABLE 4

| | Composition | Max. Flex. Strain (mm) | Izod Strength (kg · cm/cm)(*1) | | |
|---|---|---|---|---|---|
| Number | (Weight Ratio) | (as molded) | As Molded | Annealed(*2) | Remarks |
| Example 6 | IPP-8/GF = 60/40 | 8.0 | 14.3 | 13.3 | PATE treated with HCl |
| Example 7 | IPP-9/GF = 60/40 | 8.1 | 13.9 | 11.3 | Untreated PATE |

(*1)V-notch, 23° C.
(*2)Annealed at 204° C. for 4 hours

The determination of the physical properties (impact strength and maximum flexural strain) was carried out on the as molded pieces and the annealed pieces. The results are shown in Table 4. PATE-B shows reduction of the impact strength after annealing larger than that of PATE-C.

EXAMPLE 8

The PATE composition (IPPs-1,2,3,4,5,8 and 9) obtained in Examples 1 to 7, without mixing a glass fiber, a stabilizer, etc. and the PATE composition (IPPs-6 and 7) obtained by adding PATE to adjust the ratio of PATE/polyacrylic ester rubber to 5/1 by weight were supplied separately to a twin screw extruder, extruded in strands at about 320° C. and cut into pellets. By injection-molding of the pellets at about 320° C., test pieces for the determination of the physical properties of the product were obtained. The test pieces were tested to determine Izod impact strength of as molded pieces and also the peaces with annealing for 4 hours at 204° C. The results are shown in Table 5.

COMPARATIVE EXAMPLE 6

The PATE-A polymer was singly pelletized in the same manner as in Example 8 and test pieces were prepared from the pellets and tested to determine the physical properties. The results are shown in Table 5.

COMPARATIVE EXAMPLE 7

300 g of the massive poly(2-ethylhexyl acrylate) (Mod-1) obtained in Synthetic, Experimental Example 4 were freeze-pulverized, mixed with 1,500 g of PATE, pelletized as in Example 8 and made to test pieces. The values of the physical properties of the test pieces are shown in Table 5.

TABLE 5

| Number | Composition of the Specimen (weight ratio) | Izod Strength (V-notch, 23° C.) (kg · cm/cm) | |
|---|---|---|---|
| | | As Molded | Annealed(*1) |
| Example 8 | IPP-1:PATE-A/2EHA (50/10) | 9.7 | 6.2 |
| Example 8 | IPP-2:PATE-A/2EHA/TMPTA (50/9.9/0.1) | 6.0 | 5.0 |
| Example 8 | IPP-3:PATE-A/2EHA/St (50/9/1) | 5.1 | 4.2 |
| Example 8 | IPP-4:PATE-A/BA (50/10) | 6.3 | 5.1 |
| Example 8 | IPP-5:Ryton P-4/2EHA (50/10) | 2.9 | 2.8 |
| Example 8 | IPP-6:PATE-A/2EHA (50/30) + PATE A | 4.2 | 3.3 |
| Example 8 | IPP-7:PATE-A/2EHA (50/30) + PATE A | 4.2 | 3.1 |
| Example 8 | IPP-8:PATE-C/2EHA (50/10) | 8.6 | 5.9 |
| Example 8 | IPP-9:PATE-B/2EHA (50/10) | 7.5 | 4.1 |
| Com. Ex. 6 | PATE-A | 1.5 | 1.4 |
| Com. Ex. 7 | PATE-A/Mod-1 (50/10) | 2.9 | 2.3 |

(*1)At 204° C. for 4 hours.

EXAMPLE 9

Into an autoclave of 20 liter, 11 kg of deionized water and 3,150 g of PATE (KPSW-300, made by KUREHA KAGAKU KOGYO, Co., Ltd., having an average particle diameter of 330 μm, a specific surface area of 12 m²/g, a melt-viscosity of 3,500 poise at 310° C. and shearing rate of 1,200/second, and a bulk density of 44 g/dl) were introduced and after substituting the atmosphere sufficiently by gaseous nitrogen, the pressure of the autoclave was reduced and a mixture, which had been prepared by dissolving 0.35 g of benzoyl peroxide and 1.05 g of t-butyl peroxypivalate (t-BPV), both as the polymerization initiators, in 365 g of styrene, was slowly added to the content under stirring.

After continuing the stirring for one hour at room temperature, 1.0 kg of deionized water, in which 1 g of poly(ethylene oxide) had been dissolved, was added to the autoclave, and the temperature of the autoclave was increased to 60° C. for 4 hours to polymerize the monomer and the polymerization was further performed for 3 hours at 80° C.

After stirring the content further for 2 hours at 100° C., the autoclave was cooled. After filtering the content of the autoclave through a sieve of 150 mesh, the solid matter obtained was washed with water and then dried to obtain a polymer at a yield of 3,506 g. The bulk density of the obtained polymer was 53.2 g/dl.

3 kg of the polymer alloy of PATE/polystyrene were pelletized with 35 mmφ kneading extruder. The pellets obtained were extruded through T-die, having a lip with 25 cm width and 0.55 mm gap, at 320° C. and rapidly cooled to obtain an amorphous sheet of 72 μm thickness.

Just to know the situation of the polystyrene in the pores of PATE particle, said polymer alloy of PATE/polystyrene was put into an autoclave and heated with toluene at 180° C. for 3 hours. The extracted amount of polystyrene was around 70% by weight of the total weight of polystyrene. Accordingly, around 30 wt % of polystyrene is left inside the PATE particle. It is assumed that chemical bonding such as graft polymerization or some strong adsorption exists.

As a comparative example, 365 g of commercial polystyrene (TOPOLEX HI-860; made by MITSUI-TOATSU Co. Ltd.) were mixed with 3,150 g of PATE used in this Example 9, in the same manner as above.

The obtained mixture was pelletized by melt-kneading under the same conditions as above and an amorphous sheet of 87 μm in thickness was obtained in the same manner as above.

By observing the dispersion of polystyrene in each of the amorphous sheets by a scanning type electronmicroscope, it was found that polystyrene in the sheet prepared from the polymer alloy of the present invention was dispersed uniformly and finely.

Further, polystyrene particles dispersed in the sheet prepared from the simply blended composition with the commercial polystyrene of the comparative Example have the size reaching to several μm. On the other hand, polystyrene particles dispersed in the sheet of the present invention have the size of not larger than 1 μm (0.2 to 0.3 μm) and the particles are dispersed in finer particles.

EXAMPLES 10-14

In the same manner as in Example 9, water and PATE-D or PATE-E, which had been obtained in Synthetic, Experimental Example 3, were introduced into an autoclave of 20 liters and after substituting an atmosphere of the autoclave by gaseous nitrogen sufficiently, the pressure of the autoclave was reduced, and styrene and/or divinylbenzene, in which a polymerization initiator had been dissolved, were introduced into the autoclave at the ratio shown in Table 6 under stirring.

After stirring the content for one hour at room temperature, the temperature was increased and the monomers were polymerized at 60° C. for 13 hours and at 100° C. for further 3 hours.

After cooling the autoclave, the content was filtered through a sieve of 150 mesh to obtain a solid matter. The solid matter was sufficiently washed with water and then dried to obtain a polymer alloy. The properties of the obtained polymer alloy are shown in Table 6.

The melt-flow properties of the polymer alloy is different from that of PATE-D, namely, dependency of the melt-viscosity on the shearing rate of the polymer alloy is larger than that of PATE-D. This fact means that the melt elasticity of the polymer alloy is high and accordingly generation of flashes becomes low when injection-molded. In order to confirm this behavior, the following experiment was performed:

PATE-D and each of polymer alloys of PATE obtained in Examples 10,11 and 12 were mixed by Henschel mixer in the ratio shown in Table 7. Then, the mixed polymer alloys were further blended with a glass fiber (13 μm in diameter, 3 mm in length, made by NIHON DENKI GARASU Co., Ltd.) by a tumbler mixer.

The obtained mixture was extruded by a twin screw extruder of 30 mm in inner diameter to pelletize. The pellets were injection-molded by a machine (IS-25E V: made by TOSHIBA KIKAI Co., Ltd.) provided with a metal mold to evaluate flash property (temperature of the metal mold: 145° C.; and holding pressure: 500 kg/cm²), and the lengths of flashes were compared.

The metal mold to evaluate flash property has a cavity of 2 mm×40 mm×40 mm and a gate part of 2 mm in width at the center of a side of the square of the cavity. Four gaps for measuring the flash (4 mm in width, 6 mm in length and 30 μm in thickness) have been provided both on the side having the gate part and the opposing side. The results of the evaluation are shown in Table 7.

As are clearly shown in Table 7, the polymer alloy of PATE according to the present invention has a remarkable effect in improving an anti-flash property of the injection-molded product together with the already described properties.

TABLE 6

| EXAMPLE | 10 | 11 | 12 | 13 | 14 | — |
|---|---|---|---|---|---|---|
| PATE used | PATE-D | PATE-D | PATE-D | PATE-E | PATE-D | PATE-D |
| PATE (kg) | 2.5 | 2.5 | 2.5 | 2.5 | 1.5 | — |
| Water (kg) | 10 | 10 | 10 | 10 | 10 | — |
| Styrene (g) | — | — | — | — | 1,000 | — |
| DVB (g) | 434 | 870 | 116 | 116 | 200 | — |
| t-BPV (g) | 4.4 | 8.7 | 1.6 | 1.6 | 12 | — |
| Bulk Density (g/dl) | 43.8 | 47.2 | 38 | 38 | — | — |
| η*200 | 25,000 | 43,000 | 6,400 | 6,500 | 37,000 | 1,900 |
| η*1200 | 7,500 | 12,000 | 2,700 | 2,600 | 9,600 | 1,400 |
| η*200/η*1200 | 3.3 | 3.6 | 2.4 | 2.5 | 3.9 | 1.4 |

PATE-D: PATE treated with NH₄Cl
PATE-E: PATE treated with NH₄Cl and preserved in a wet state. Figure shown is dry weight base.
η*200: Melt viscosity measured at 310° C. and shearing rate of 200/second.
η*1200: Melt viscosity measured at 310° C. and shearing rate of 1,200/second.
DVB: Divinylbenzene made by SANKYO KASEI Co., Ltd. Purity = 57% and most of the impurities are ethylstyrene
t-BPV: t-Butyl peroxypivalate made by NIHON YUSHI Co., Ltd. Purity = 70 wt %.

TABLE 7

| Ratio of Components Charged (% by weight) | | | | Length of | Evalua- |
|---|---|---|---|---|---|
| Polymer Alloy of PATE | | | | Flash (mm) | tion of |
| PATE-D | Amount | Example No. | GF | (*1) | Flash(*2) |
| 60 | 0 | — | 40 | 0.25 | poor |
| 0 | 60 | Example 10 | 40 | 0.05 | excellent |
| 30 | 30 | Example 10 | 40 | 0.18 | normal |
| 48 | 12 | Example 11 | 40 | 0.19 | normal |
| 42 | 18 | Example 11 | 40 | 0.14 | good |
| 0 | 60 | Example 12 | 40 | 0.12 | good |
| 30 | 30 | Example 12 | 40 | 0.19 | normal |

(*1)The length of flash is the average value of the lengths measured in the enlarged photograph.
(*2)The evaluation of flash was judged from the length of flash and the variation thereof. When the injection-molded products under usual conditions have no practical problem in flash property, it is judged as "normal".

What is claimed is:

1. A process for producing a polymer alloy of polyarylene thioether, comprising the steps of:
    (1) impregnating 100 parts by weight of particulate polyarylene thioether consisting of repeating units Ar-S, wherein Ar is an arylene group, which contains not less than 60 mol % of repeating units of paraphenylene sulfide,

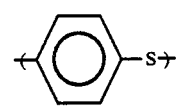

with 0.1–100 parts by weight of at least one kind of radically polymerizable monomer containing a polymerization initiator at a temperature at which polymerization of said monomer does not substantially begin; and
    (2) increasing the temperature of the reaction system so that substantially all the monomer sufficiently radically polymerizes.

2. The process according to claim 1, wherein at least a part of said radically polymerizable monomer is radically polymerized within inner pores of said polyarylene thioether particles.

3. The process according to claim 1, wherein when said polyarylene thioether particles are impregnated with said radically polymerizable monomer, said particles are kept under a reduced pressure.

4. The process according to claim 1, wherein the specific surface area of said polyarylene thioether particles in a dry state is not less than 3 m²/g.

5. The process according to claim 1, wherein said polyarylene thioether particles, prior to impregnation with monomer, are treated by immersing them in an aqueous solution of an acid or an aqueous solution of a salt prepared by reacting a strong acid and a weak base.

6. The process according to claim 1, wherein the average diameter of said polyarylene thioether particles is not less than 100 μm and not more than 3,000 μm.

7. The process according to claim 1, wherein said polymerization initiator is dissolved in said radically polymerizable monomer.

8. The process according to claim 1, wherein said radically polymerizable monomer is one or more than one monomer selected from the group consisting of ethylene, propylene, isobutylene, styrene, α-methylstyrene, α-vinylnaphthalene, β-vinylnaphthalene, 2-isopropenylnaphthalene, p-methylstyrene, divinylbenzene, methyl acrylate, ethyl acrylate, n-propyl acrylate, isopropyl acrylate, n-butyl acrylate, sec-butyl acrylate, hexyl acrylate, n-octyl acrylate, 2-ethyhexyl acrylate, methoxypolyethylene glycol acrylate, methyl methacrylate, ethyl methacrylate, n-butyl methacrylate, methoxypolyethylene glycol methacrylate, glycidyl methacrylate, allyl acrylate, vinyl acrylate, trimethylolpropane triacrylate, ethylene glycol diacrylate, diethylene glycol diacrylate, triethylene glycol diacrylate, polyethylene glycol diacrylate not including diethylene glycol diacrylate and triethylene glycol diacrylate, neopentyl glycol diacrylate, ethylene glycol dimethacrylate, diethylene glycol dimethacrylate, triethylene glycol dimethyacrylate, neopentyl glycol dimethacrylate, trimethylolpropane trimethacrylate, vinyl chloride, vinylidene chloride, vinyl fluoride, vinylidene fluoride, trifluorochloroethylene, tetrafluoroethylene, hexafluoropropylene, acrylamide, methacrylamide, maleic anhydride, monobutylitaconic acid, monoethylitaconic acid, monomethylmaleic acid, monoethylmaleic acid, maleimide, N-methylmaleimide, N-phenylmaleimide, butadiene, isoprene, chloroprene, vinyl acetate, vinyl butyrate, acrylonitrile, methacrylonitrile, methylvinylketone, ethylvinylketone, phenylvinylketone, isopropylvinylketone, diallyl phthalate, triallyl cyanurate and triallyl isocyanurate.

* * * * *